Oct. 23, 1928.

J. K. DIAMOND 1,689,013

BELT FASTENER APPLYING MACHINE

Filed April 29, 1926   2 Sheets-Sheet 1

INVENTOR
James K. Diamond
BY
Chappell Earl
ATTORNEYS

Oct. 23, 1928.　　　　　　　　　　　　　　　　　1,689,013
J. K. DIAMOND
BELT FASTENER APPLYING MACHINE
Filed April 29, 1926　　　2 Sheets-Sheet 2

INVENTOR
James K. Diamond
BY Chappell Earl
ATTORNEYS

Patented Oct. 23, 1928.                                                                        1,689,013

UNITED STATES PATENT OFFICE.

JAMES K. DIAMOND, OF GRAND RAPIDS, MICHIGAN, ASSIGNOR TO CLIPPER BELT LACER COMPANY, OF GRAND RAPIDS, MICHIGAN.

BELT-FASTENER-APPLYING MACHINE.

Application filed April 29, 1926.   Serial No. 105,425.

The main objects of this invention are:

First, to provide an improved machine for applying belt fasteners or the like by means of which fasteners may be uniformly and evenly applied or affixed to belts or like objects of varying thickness.

Second, to provide an improved belt fastener applying machine which is capable of wide adjustment and may be used on belts of different thicknesses and of considerable width.

Third, to provide an improved machine of the class described which is easily and quickly manipulated.

Objects pertaining to details and economies of construction and operation of my invention will definitely appear from the detailed description to follow. The invention is clearly defined and pointed out in the claims.

A structure embodying the features of my invention is clearly illustrated in the accompanying drawing forming a part of this application, in which.

Figure 1:
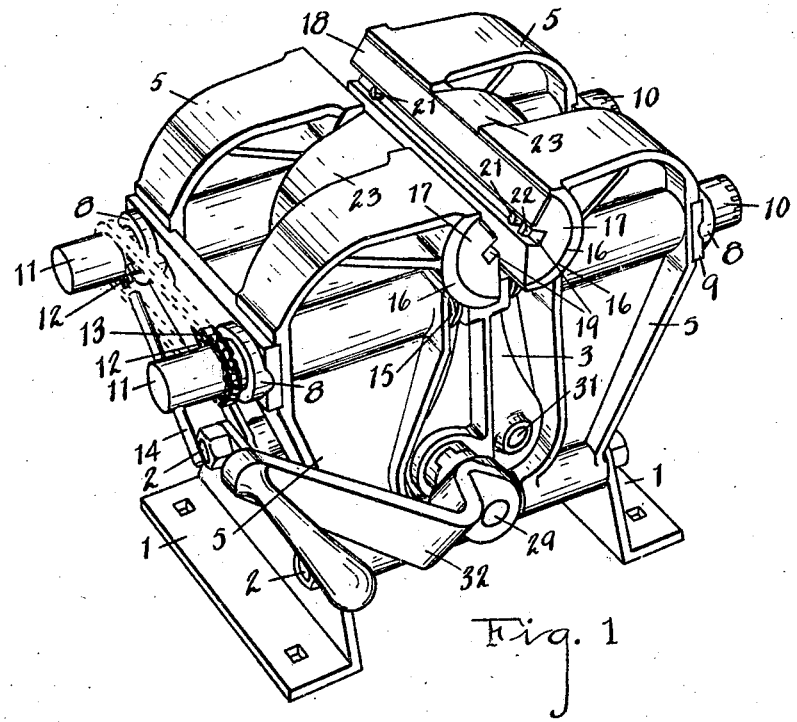
Fig. 1 is a perspective view of a machine embodying the features of my invention.
Figure 2:
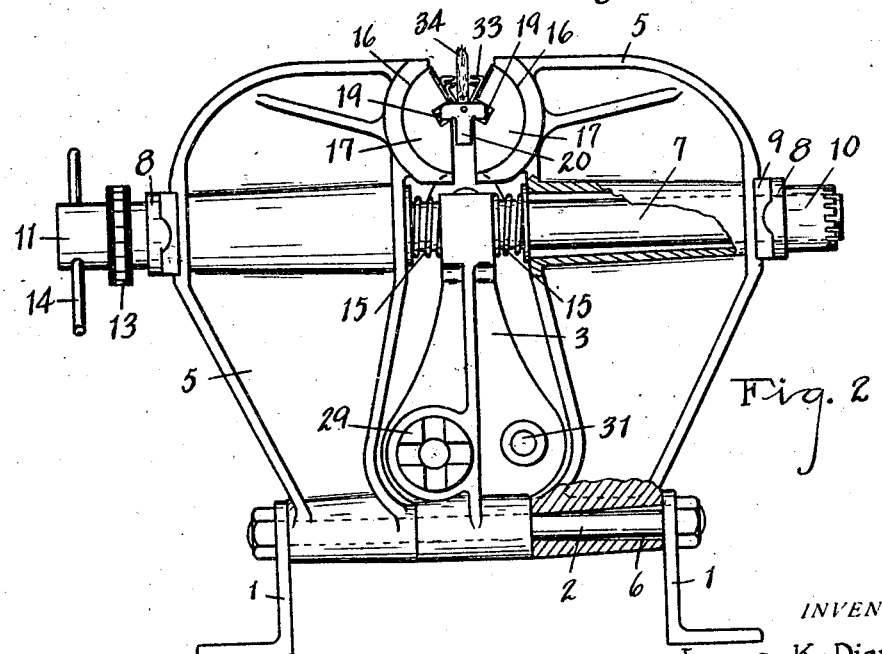
Fig. 2 is a side elevation with parts broken away to show structural details.
Figure 3:
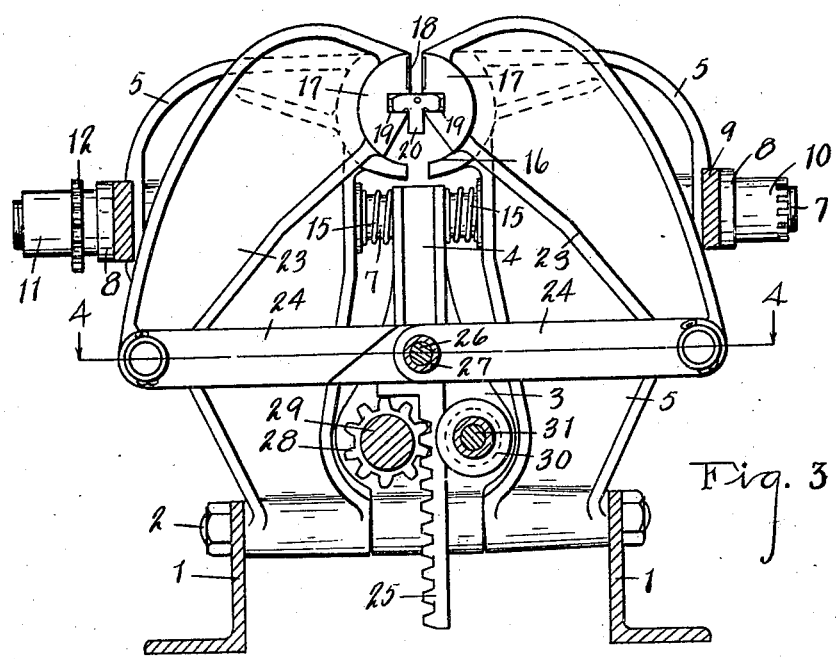
Fig. 3 is a vertical section on a line corresponding to line 3—3 of Fig 4.
Figures 5, 6:
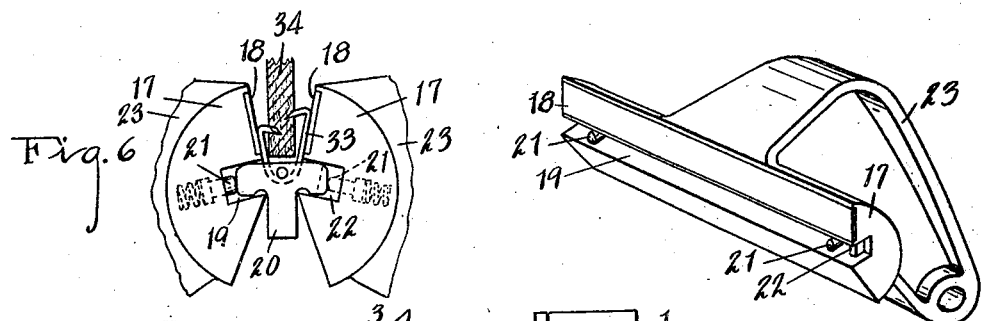
Fig. 5 is a perspective view of one of the jaws.
Fig. 6 is a fragmentary view showing a piece of belt in position to receive the fasteners, the jaws being partially closed.
Figure 4:
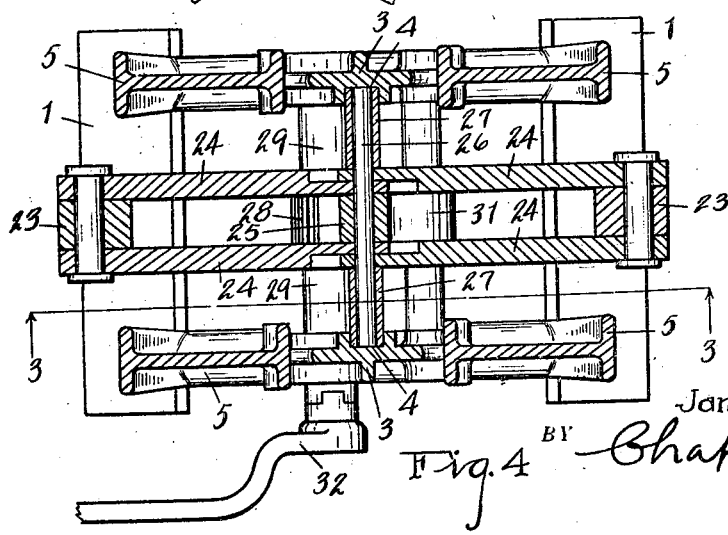
Fig. 4 is a horizontal section on a line corresponding to line 4—4 of Fig. 3.

In the embodiment illustrated the base members 1 are adapted to be mounted on a suitable table or bench. These base members carry base rods 2 on which are mounted uprights 3. These uprights have inwardly facing opposed ways 4. Jaw supporting members 5 are arranged in opposed pairs on the rods 2, these supporting members having tapered portions 6 of such dimensions as to permit tilting adjustment of the jaw supporting members, thereby swinging their upward ends to and from each other.

These supporting members are supported and adjusted by means of the rods 7 having thrust collars 8 engaging the cross bar 9 at one end, nuts 10 being provided at one end and nuts 11 at the other, the nuts 11 having sprockets 12 thereon connected by the chain 13 for simultaneous adjustment of the nuts. One of the nuts 11 is provided with a hand piece 14.

Springs 15 are arranged between the support members 5 and the uprights 3 to urge the support members outwardly or to open them as the adjustment of the nuts permits. The support members 5 are provided with facing cylindrically curved segmental bearings 16. The jaws 17 of segmental cross section are arranged in these bearings for rocking or rotating adjustment therein, the jaws having radial faces 18 disposed above their axial centers and oppositely disposed longitudinal grooves 19 at approximately their axial centers.

The fastener holder 20 is arranged in these recesses so that it is floatingly supported by the jaws, spring pressed plungers 21 acting to hold the holder in a central position. One of the recesses is provided with a lug 22 engaging the holder and supporting it longitudinally.

The jaws are provided with downwardly projecting arms 23 disposed between the pairs of jaw supports 5 and the lower ends of these arms are connected by the links 24 to the vertically reciprocating rack 25, the connection being made by the cross pin 26. On the ends of this cross pin are rollers 27 engaging the ways 4 in the uprights.

The driving pinion 28 on the shaft 29 coacts with this rack to reciprocate the rollers. A supporting roller 30 is arranged in opposed relation to the pinion, the roller being carried by a shaft 31 extending between the uprights. The shaft 29 is driven from the crank 32.

The structure of this application is a modification of the structure shown in my application for Letters Patent filed concurrently herewith, the jaws and their mountings in the support members being the important difference.

In using the machine, the jaws are opened and the support members adjusted to permit the loading of the fastener holder 20 which is adapted to receive a plurality of fasteners, indicated at 33. The belt indicated at 34 is placed between the prongs of the fasteners and the jaws are actuated to set the fasteners. If the fasteners are not completely set by the first actuation of the jaws, the jaw supports are adjusted toward each other and the jaws again actuated, these operations being continued until the fasteners are completely set.

My improved fastener applying machine is capable of very rapid manipulation and is very powerful; that is, a large number of fasteners may be easily set or forced into a belt at one time by manual power. The machine may be readily adjusted to the particular belt.

Having thus described my invention what I claim as new and desire to secure by Letters Patent is:

1. In a structure of the class described, the combination of opposed pairs of jaw supports mounted for adjustment to and from each other and provided with opposed cylindrically curved bearings, a screw means for simultaneously adjusting said members and rigidly supporting them in their adjusted positions, jaws of segmental cross section mounted in said bearings and having flat jaw faces above the axial centers thereof and opposed centrally disposed longitudinal recesses adjacent the axial centers thereof, a fastener holder floatingly mounted in said recesses, said jaws being provided with yielding centering means for said holders, downwardly projecting arms on said jaws disposed between said supports, and operating means for said jaws connected to said arms.

2. In a structure of the class described, the combination of opposed pairs of jaw supports mounted for adjustment to and from each other and provided with opposed cylindrically curved bearings, a screw means for simultaneously adjusting said member and rigidly supporting them in their adjusted positions, jaws of segmental cross section mounted in said bearings and having flat jaw faces above the axial centers thereof, a fastener holder operatively associated with said jaws, downwardly projecting arms on said jaws disposed between said supports, and operating means for said jaws connected to said arms.

3. In a structure of the class described, the combination of opposed pairs of jaw supports mounted for adjustment to and from each other and provided with opposed curbed bearings, a screw means for simultaneously adjusting said members and rigidly supporting them in their adjusted positions, jaws mounted in said bearings and having opposed centrally disposed longitudinal recesses adjacent the axial centers thereof, a fastener holder floatingly mounted in said recesses, said jaws being provided with yielding centering means for said holders, downwardly projecting arms on said jaws disposed between said supports, and operating means for said jaws connected to said arms.

4. In a structure of the class described, the combination of opposed pairs of jaw supports mounted for adjustment to and from each other and provided with opposed curved bearings, a screw means for simultaneously adjusting said members and rigidly supporting them in their adjusted positions, jaws mounted in said bearings, a fastener holder operatively associated with said jaws, downwardly projecting arms on said jaws disposed between said supports, and operating means for said jaws connected to said arms.

5. In a structure of the class described, the combination of opposed jaw supporting members having cylindrically curved facing bearings, a pair of coacting jaws of segmental cross section disposed in said bearings, said jaws being provided with opposed longitudinal recesses, a fastener holder floatingly supported in said recesses, spring means carried by said jaws coacting with the edges of said holder, and means for rocking said jaws in their bearings to open and close the same.

6. In a structure of the class described, the combination of opposed jaw supporting members provided with segmental facing bearings, coacting jaws of segmental cross section disposed in said bearings, said jaws having radially disposed jaw faces lying within the arcs of said bearings, a fastener holder floatingly mounted on said jaws at approximately the axial center thereof, and means for opening and closing said jaws.

7. In a structure of the class described, the combination of opposed jaw supporting members provided with segmental facing bearings, coacting jaws of segmental cross section disposed in said bearings, a fastener holder floatingly mounted on said jaws at approximately the axial center thereof, and means for opening and closing said jaws.

8. In a structure of the class described, the combination of opposed jaw supporting members mounted for adjustment to and from each other, a pair of coacting rotatable jaws of segmental cross section rotatably mounted on said supports in opposed relation, and a fastener holder carried by said jaws.

9. In a structure of the class described, the combination of jaw supporting members having opposed curved bearings, coacting jaws rotatably mounted in said bearings, a fastener holder carried by said jaws, and means for simultaneously actuating said jaws.

10. In a structure of the class described, the combination of opposed adjustably mounted jaw supporting members having cylindrically curved facing bearings, means for simultaneously adjusting said jaw supporting members to and from each other, a pair of opposed coacting jaws of segmental cross section disposed in said bearings, and means independent of said jaw adjusting means for simultaneously rocking said jaws in their bearings to open and close the same.

11. In a structure of the class described, the combination of adjustably mounted opposed jaw supporting members provided with opposed bearings, means for simultaneously adjusting said members to and from each other, a pair of opposed jaws rotatably mounted in said bearings of said jaw supporting members and provided with radially disposed jaw faces lying within the arcs of the bearings, and means for simultaneously rotating said jaws to open and close the same independently of the adjustment of said jaw supporting members.

In witness whereof I have hereunto set my hand.

JAMES K. DIAMOND.